(12) United States Patent
Wermelinger

(10) Patent No.: US 9,358,743 B2
(45) Date of Patent: Jun. 7, 2016

(54) METHOD AND DEVICE FOR THE BUTT-WELDING OF PIPES MADE OF THERMOPLASTIC MATERIAL

(75) Inventor: Joerg Wermelinger, Schaffhausen (CH)

(73) Assignee: George Fischer Rohrleitungssysteme AG, Schaffhausen (CH)

( * ) Notice: Subject to any disclaimer, the term of this patent is extended or adjusted under 35 U.S.C. 154(b) by 138 days.

(21) Appl. No.: 13/704,090

(22) PCT Filed: Jun. 1, 2011

(86) PCT No.: PCT/EP2011/059097
§ 371 (c)(1),
(2), (4) Date: Feb. 1, 2013

(87) PCT Pub. No.: WO2011/157563
PCT Pub. Date: Dec. 22, 2011

(65) Prior Publication Data
US 2013/0126088 A1    May 23, 2013

(30) Foreign Application Priority Data

Jun. 16, 2010 (EP) .................................... 10166105

(51) Int. Cl.
*B29C 65/20* (2006.01)
*B29D 23/00* (2006.01)
(Continued)

(52) U.S. Cl.
CPC .............. *B29D 23/003* (2013.01); *B26D 3/166* (2013.01); *B29C 65/20* (2013.01);
(Continued)

(58) Field of Classification Search
CPC .............. B29C 66/114; B29C 66/1142; B29C 65/2092; B29C 65/18; B29C 65/20; B29C 65/2076; B29C 65/7802; B29C 65/7835; B29C 65/7841; B29C 66/5221; B29C 66/73921; B29C 66/8242; B29C 66/9121; B29C 66/91221; B29C 66/91421; B29C 66/91431; B29C 66/91651; B29C 66/9221; B29C 66/92441; B29C 66/92443; B29C 66/92651; B29C 66/92655; B29C 66/9292; B29C 66/92921; B29C 66/9441; B29C 66/961; B26D 3/166
USPC ...................... 156/304.1, 304.2, 304.5, 304.6
See application file for complete search history.

(56) References Cited

U.S. PATENT DOCUMENTS 4,957,570 A * 9/1990 Jenkins ................... B29C 65/20
156/158
5,013,376 A * 5/1991 McElroy et al. ................ 156/64
(Continued)

FOREIGN PATENT DOCUMENTS

DE 19827146 A1 12/1999
EP 0453903 * 10/1991 .......... B29C 65/1432
(Continued)

OTHER PUBLICATIONS

EP0453903—Machine Translation, Haug et al., Oct. 30, 1991.*
(Continued)

*Primary Examiner* — Michael Tolin
(74) *Attorney, Agent, or Firm* — Bachman & LaPointe, P.C.

(57) ABSTRACT

A method and a device for welding plastic pipes (1) made of thermoplastic material by a butt-welding method, wherein the pipes (1) are held in a coaxial position in relation to one another by clamping points (2), are trimmed by a trimmer (3), which can be brought between the clamping points (2), and are heated up by heated tools (6), which can be fitted in place of the trimmer (3), wherein the heating of the free pipe ends (8) to be welded has the effect of forming a melting region which forms a bead when pressing occurs, the pipe projection (5) of the pipes (1) being trimmed to a defined size.

15 Claims, 3 Drawing Sheets

(51) Int. Cl.
  *B29C 65/78* (2006.01)
  *B29C 65/00* (2006.01)
  *B26D 3/16* (2006.01)
  *B29L 23/00* (2006.01)
  *B29K 101/12* (2006.01)

(52) U.S. Cl.
  CPC ........ *B29C 65/2092* (2013.01); *B29C 65/7835* (2013.01); *B29C 66/022* (2013.01); *B29C 66/0322* (2013.01); *B29C 66/1142* (2013.01); *B29C 66/32* (2013.01); *B29C 66/5221* (2013.01); *B29C 66/73921* (2013.01); *B29C 66/80* (2013.01); *B29C 66/9121* (2013.01); *B29C 66/91431* (2013.01); *B29C 66/9221* (2013.01); *B29C 66/9231* (2013.01); *B29C 66/9261* (2013.01); *B29C 66/92441* (2013.01); *B29C 66/92445* (2013.01); *B29C 66/92651* (2013.01); *B29C 66/92921* (2013.01); *B29C 66/9441* (2013.01); *B29C 66/974* (2013.01); *B29C 66/961* (2013.01); *B29C 2793/0081* (2013.01); *B29K 2101/12* (2013.01); *B29L 2023/22* (2013.01)

(56) References Cited

U.S. PATENT DOCUMENTS

| | | | | |
|---|---|---|---|---|
| 5,241,157 | A | * | 8/1993 | Wermelinger et al. ....... 219/243 |
| 5,325,604 | A | * | 7/1994 | Little .............................. 34/493 |
| 5,484,506 | A | * | 1/1996 | DuPont et al. ................ 156/503 |
| 6,036,795 | A | * | 3/2000 | Sauron et al. .................... 156/64 |
| 2005/0121132 | A1 | * | 6/2005 | Bacik et al. ..................... 156/64 |
| 2006/0032349 | A1 | * | 2/2006 | Temple ............................. 83/13 |

FOREIGN PATENT DOCUMENTS

| | | |
|---|---|---|
| EP | 0453903 A2 | 10/1991 |
| FR | 2598653 A1 | 11/1987 |

OTHER PUBLICATIONS

EP0453903—Machine Translation; Haug, Peter; Oct. 30, 1991.*

* cited by examiner

METHOD AND DEVICE FOR THE BUTT-WELDING OF PIPES MADE OF THERMOPLASTIC MATERIAL

BACKGROUND OF THE INVENTION

The invention relates to a method and a device for welding plastic pipes made of thermoplastic material by means of a butt-welding process, the pipes being held in a coaxial position in relation to one another by means of clamping fixtures, trimmed by means of a trimmer which can be brought between the clamping fixtures and heated up by means of heated tools which can be fitted in place of the trimmer, the heating of the free pipe ends to be welded having the effect of producing a melting region, which forms a bead when pressing occurs.

The known method for the butt-welding of two plastic pipes has so far always proceeded in substantially the same way, whether performed by manual or automatic machines. The plastic pipes are clamped in the clamping fixtures provided for them, the opposite pipe ends projecting from the clamping fixtures and all damage and soiling being removed by cutting with the trimmer located between the two pipe ends and moving the clamping fixtures together, in the direction of the rotating trimmer. In addition, the effect is achieved that the end faces of the pipe ends are at right angles to the axis of the pipe and parallel to the opposite end face of the other pipe end. Subsequently, the pipe ends are moved apart and the trimmer removed, after which a heated tool is brought between the pipes, whereupon the clamping fixtures are moved together again in order to bring the end faces of the pipe ends into contact with the heated tool. The pipe ends are brought into contact with the heated tool under a predetermined, constant pressure, which is dependent on the material, the pipe diameter and the wall thickness. The pressure, which is usually generated by means of a hydraulic unit, is exerted on the two pipe ends or the heated tool until beads corresponding to the predetermined dimensions are produced on the circumference of the pipe ends. In the subsequent heating-up phase, the pressure is reduced and maintained over a prescribed time in order to achieve the temperature profile that is required for welding in the joining zone of the plastic pipe. After that, the clamping fixtures are pushed apart again, the heated tool is removed and the pipe ends are subsequently pressed together under a predetermined pressure and for a defined time period, so that a required penetration of the pipe ends takes place and welding of the pipe ends is ensured. With this type of production of welded connections of plastic pipes, the beads are not optimized in their size and tend to be large, which has an adverse influence on the flow in the pipe and also requires long process times.

DE 198 27 146 A1 discloses a method for the butt-welding of plastic pipes, the clamping fixtures being driven by an electric motor which is assigned a controller. Starting from the position in which the two pipe ends are in contact with the heated tool, the clamping fixtures move in accordance with a predetermined time-displacement curve which is stored in the controller, is assigned a required displacement for bringing the ends into contact with the heated tool and is substantially stopped during the heating-up phase. After the removal of the heated tools, the clamping fixtures undergo a specific displacement, required for joining, in accordance with a second predetermined time-displacement curve, starting from the position in which the two pipe ends come into contact with one another at the beginning of the joining process, and are substantially stopped during the cooling-down phase.

A disadvantage of such a solution is that the method requires a complex controller, in which there is stored for each diameter and each material a corresponding time-displacement curve. Moreover, the device requires feelers or sensors for determining the position of the pipe ends, which must be determined twice during a welding operation.

The object of the invention is to propose a method and an associated device that make it possible for pipe ends to be welded with minimal bead formation, while maintaining safety conditions, and minimize energy and time consumption and moreover manage with a low-cost and simple controller.

SUMMARY OF THE INVENTION

The foregoing object is achieved according to the invention by the projection of the pipes being trimmed to a defined size; that is to say the pipe projections are prepared to the same length for each welding operation, which is achieved by mechanical stops that serve as displacement limiters or by a built-in displacement measuring system which is connected to the controller and makes it possible to go exactly to the position desired. The fact that trimming is performed to a defined size and the temperature of the heated tool or the heating-up time is made to match the temperature of the pipe, which corresponds to ambient temperature, means that there is no longer any need for a separate heated-tool contacting phase that runs over a defined time period separate from the heating-up phase. Until now, the heated-tool contacting phase, in which a defined pressure is exerted on the pipe projections during a predetermined time period, was used to achieve a desired bead, conforming to the requirements. The size of the bead can be used to deduce the temperature in the joining zone, and consequently ensure good welding, but such large beads are produced that the flow in the pipes is impaired, which can be reduced by the new method described here. Since, however, contact of the pipe projections with the heated tool is a precondition for a good heat transfer, the pipe projection has a length allowance of up to 0.5 mm in comparison with the heating stop, this provides a minimal adjustment for contacting the heated tool, which is integrated in the heating-up phase, since the temperature adaptation of the heated tool or the adaptation of the duration of the heating-up phase to the pipe temperature or ambient temperature means that a separate heated-tool contacting phase is no longer required. Consequently, in the new method described here, the adjustment for contacting the heated tool no longer has the same function as in the conventional method proposed by the DVS (German Welding Society).

In the new method described here, the heated-tool temperature is adapted to the pipe temperature, which corresponds to ambient temperature. The ambient temperature is determined for example with the aid of a sensor and is compared in the controller with a standard value, which is assigned a heated-tool temperature. The difference between the standard value and the measured value is added to the heated-tool temperature or subtracted from the heated-tool temperature of the standard value. In the case of a low ambient temperature, a correspondingly higher heated-tool temperature is required, and vice versa.

Another possibility of adapting the welding process to the ambient temperature is that the time of the heating-up phase is correspondingly extended or shortened, so that, when there is a low ambient temperature or pipe temperature, the heating-up phase is extended sufficiently. Instead of determining the ambient temperature, it is also conceivable to measure the pipe temperature directly on the pipe.

In the joining phase there is the possibility of limiting the joining displacement, by means of a mechanical stop or a displacement measuring system; in the new method described here there is of course also the alternative of carrying out the joining in a pressure-controlled manner. The new method described here is distinguished by shortening the welding time, a low energy consumption and the achievement of as small a bead as possible. This has the effect that the new method described here can be carried out as easily as possible, that is to say the new method described here can be carried out without any pressure sensors and displacement measuring systems, while it is entirely conceivable and feasible to extend it by adding such applications.

BRIEF DESCRIPTION OF THE DRAWINGS

The invention is presented below on the basis of drawings of an exemplary embodiment, in which.

DETAILED DESCRIPTION

Figure 1:
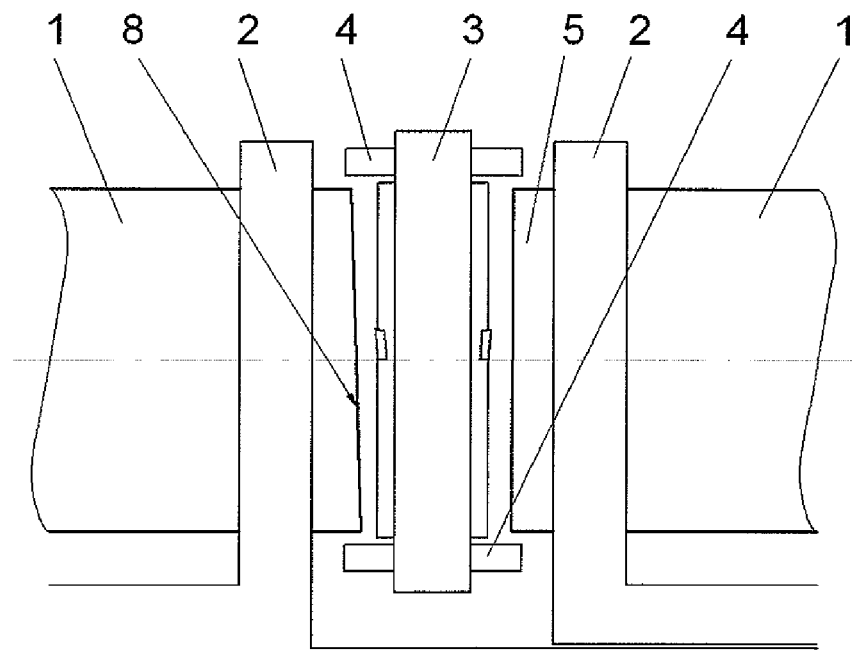
FIG. 1 shows a schematic view of a device for welding plastic pipes by the new method described here, before the trimming.
Figure 2:
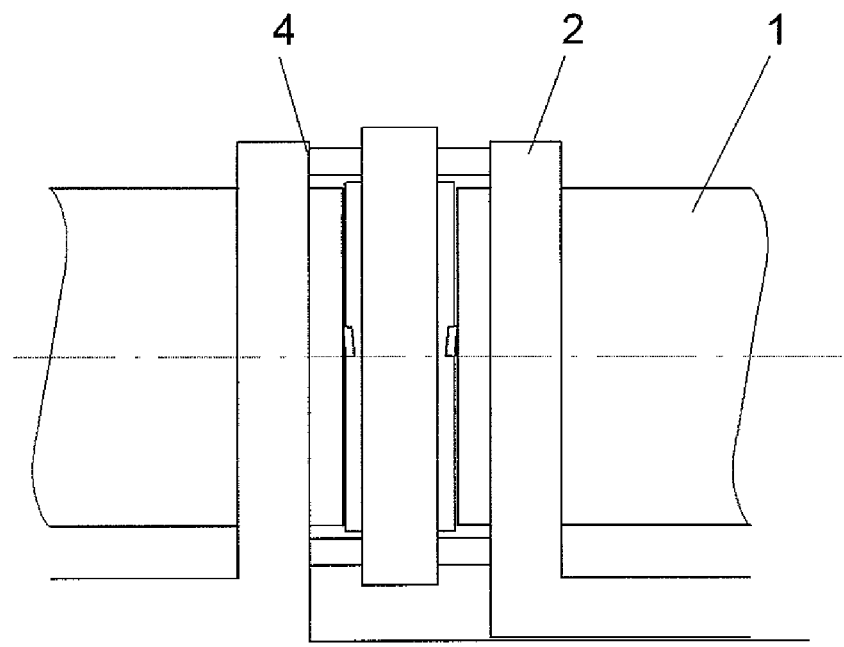
FIG. 2 shows a schematic view of a device for welding plastic pipes by the new method described here, during the trimming.
Figure 3:
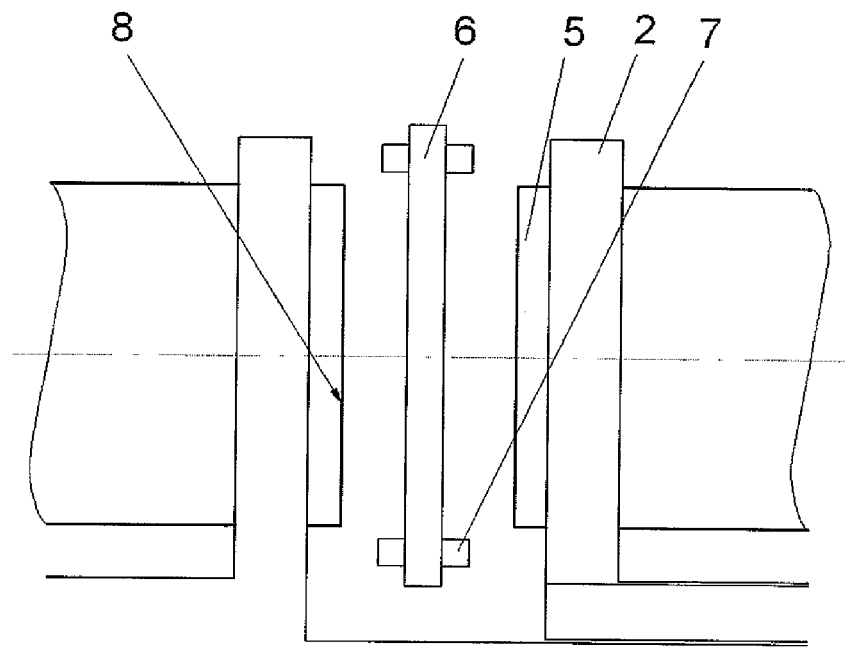
FIG. 3 shows a schematic view of a device for welding plastic pipes by the new method described here, before the heating up.
Figure 4:
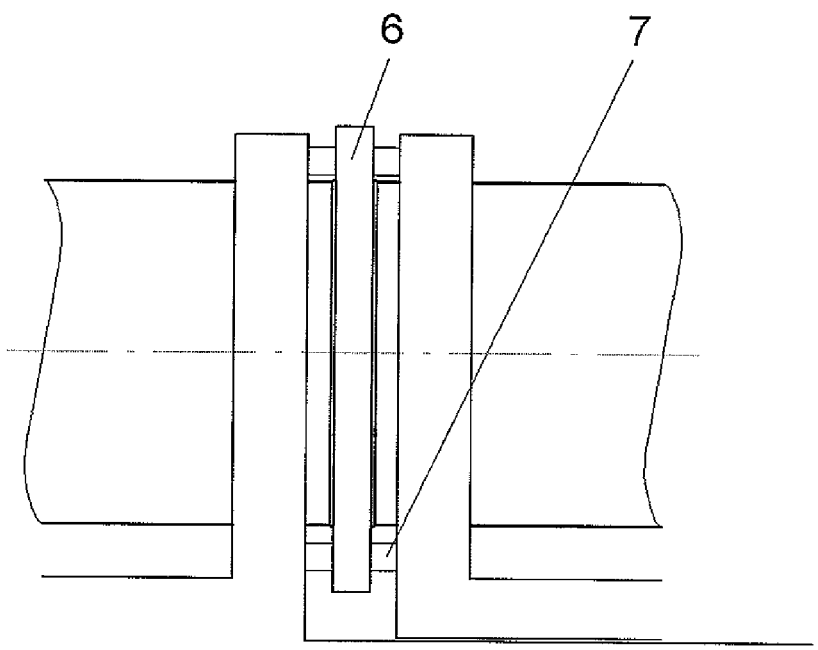
FIG. 4 shows a schematic view of a device for welding plastic pipes by the new method described here, during the heating up.

FIG. 1 shows the pipes 1 clamped in the clamping fixtures 2, before the trimming. On the trimmer 3 there are fixedly mounted trimmer stops 4, whereby the lengths of the pipe projections 5 can be trimmed exactly to size; it is also ensured that the same bead is produced in every welding operation. In FIG. 2, the clamping fixtures 2 have been moved toward the trimmer 3, until they are against the trimmer stops 4, whereby the exact length of the pipe projection is defined. In a further step, the clamping fixtures 2 with the pipes 1 clamped in are moved apart again in order to replace the trimmer 3 by the heated tool 6, as represented in FIG. 3. The heated tool 6 has heating stops 7, whereby a controlled adjustment for contacting the heated tool can be carried out if necessary. The heating stops 7 are formed in such a way in comparison with the trimmer stops 4 that they are up to 0.5 mm shorter, in order to ensure that the pipe projection 5 comes into contact with the heated tool 6 on both sides. FIG. 4 shows that the pipe projections 5 are slightly longer than the heating stops 7, whereby the moving together of the clamping fixtures 2 against the heated tool 6 causes a pressure in the pipe projection 5, until the heating process has caused the length of the pipe projection 5 to be reduced or melted away to the length of the heating stops 7 and the clamping fixtures 2 are against the heating stops 7.

Figure 5:
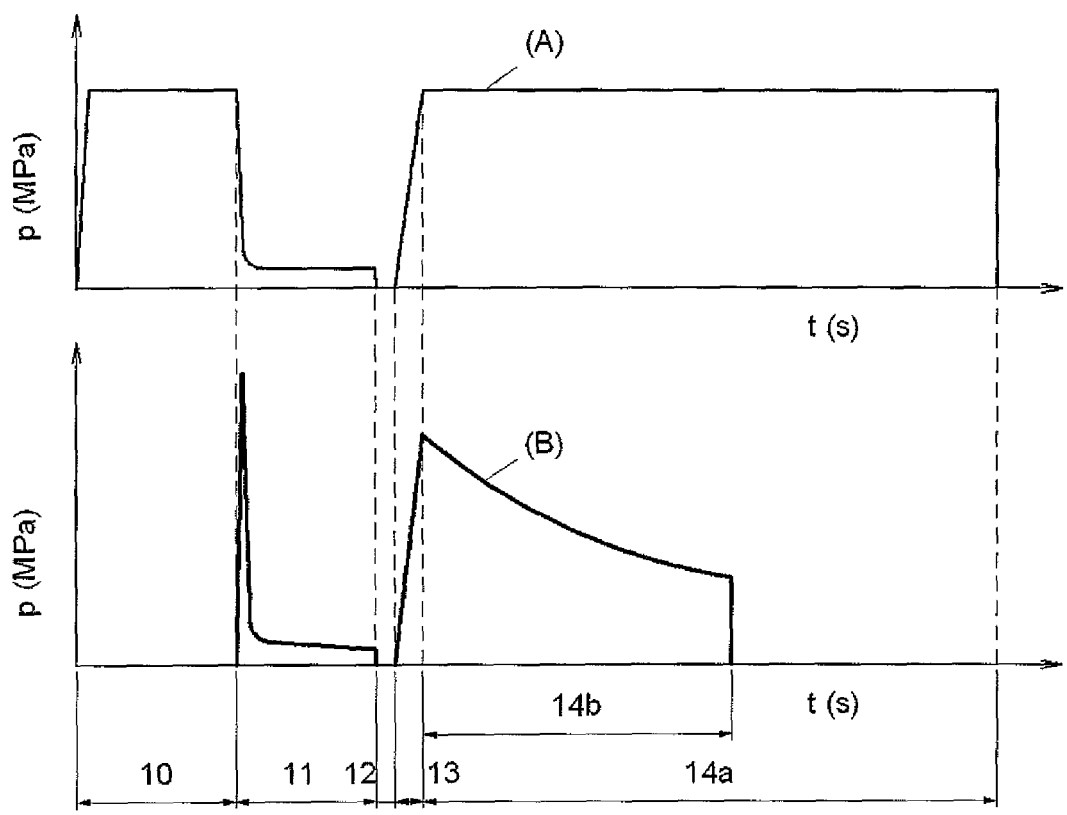
FIG. 5 shows two time-pressure diagrams in the joining zone, during the complete welding process.

FIG. 5 shows two time-pressure curves of plastic pipe welding operations. Curve A represents a conventional butt-welded connecting process proposed by the DVS (German Welding Society), after the trimming. As the first phase, the heated-tool contacting 10 can be seen, by which the projecting pipe ends 8, already trimmed but not trimmed to size, are pressed against the heated tool 6, which has been brought to a desired temperature. The heated-tool contacting operation 10 requires a certain heated-tool contact pressure. The material-dependent heated-tool contact pressure is generated by the pressing together of the pipe ends 8 against the heated tool 6 and maintained constantly until a desired value is achieved, comprising a visual check of the size of the bead. As the next phase there is the heating-up operation 11, in which the pressure is reduced to virtually zero. This operation provides the joining zone with the heat necessary for the welding. The time period for generating the required thickness of the melted layer can be determined from a table or empirical values.

As a further step there is the changeover 12, that is to say the pipes 1 are moved apart in order to remove the heated tool 6 and immediately thereafter move the pipes 1 into the welding position. The pipe ends 8 move together until the desired joining pressure, conforming to the requirements, is achieved. It is intended in this way to bring about a melt flow in the joining zone during the joining phase 13. In the subsequent cooling-down phase 14a, the pressure is maintained; the cooling-down time depends on the width of the joining zone, the melting temperature reached, the melt volume present in the weld seam and the thermal properties of the plastic. The cooling-down operation is ended when the melt in the joining zone has solidified and the plastic has become sufficiently solid.

Curve B shows the time-pressure profile of the present invention; the fact that the pipe projections 6 have been trimmed to an exact size and that the temperature of the heated tool 6 or the heating-up time 11 is adapted to the ambient temperature, and consequently the pipe temperature, means that the new method described here no longer requires any heated-tool contacting 10. The ambient temperature is detected by a sensor and for example compared with a standard value, to which a heated-tool temperature is assigned, and the difference is calculated. The temperature difference between the ambient temperature or pipe temperature and the standard value is correspondingly subtracted from or added to the heated-tool temperature. That is to say that, in the case of low ambient or pipe temperatures, the heated-tool temperature is added to the standard value by the corresponding temperature difference in order to compensate for the missing temperature in the welding. In the case of pipe temperatures above the standard value, the temperature difference is correspondingly subtracted. Such a procedure makes it possible to dispense with the heated-tool contacting phase 10. The briefly increased pressure at the beginning of the heating-up phase 11 in curve B is produced, as already mentioned, by the pipe projection allowance of up to 0.5 mm in comparison with the length of the heating stop 7, whereby it is ensured that the pipe projections 5 come into contact with the heated tool 6 and a best-possible heat transfer takes place. The pressure in the pipe projection falls as soon as the material in the pipe projection 5 is soft enough that the length allowance of at most 0.5 mm has been pressed or melted away and the clamping fixtures are against the heating stops 7; then the pressure on the material falls to virtually zero. The heating-up phase 11 of curve B corresponds to a predetermined time period to ensure an adequate take-up of heat for the welding in the joining zones. Theoretically, it would be conceivable during the heating-up phase 11 of the new method described here to avoid the high pressure at the beginning, but the pipe projections would have to be trimmed exactly to size, without any allowance, and that would entail the risk of the pipe ends 8 not being certain to lie against the heated tool 6, which would cause a narrow air gap between the heated tool 6 and the pipe end 8 and hinder a good heat transfer. In the phase 12, the changeover takes place; after the pipes 1 have been moved apart, the heated tool 6 is removed, whereupon the pipes 1 are moved together in the joining phase 13. This operation may proceed both in a displacement-controlled manner and in a pressure-controlled manner; moreover, a combined displacement-pressure control is also conceivable during the joining phase 13.

The saving of material in the new method B described here, whereby formation of an unnecessarily large bead during the welding can be avoided, allows the cooling-down phase 14b to be correspondingly shorter. In FIG. 5, a displacement-controlled joining operation 13 is represented, evident from the pressure drop after the joining, since the material in the joining zone shrinks during the cooling down 14b. Also conceivable is a pressure-controlled joining operation, which is known from the prior art and which would keep the pressure constant during the cooling-down phase. Both variants of the cooling down are carried out during a predetermined time period stored in the controller. For monitoring the cooling-down operation, it is also conceivable for the pipe temperature in the joining zone to be measured during the cooling-down phase, thereby establishing when the temperature has dropped adequately to release the pipes 1 from the clamping fixtures 2. In spite of its low time requirement and the energy that is saved, the new welding method provides a welding operation that conforms to the requirements of the standards, and makes an optimized flow through the pipe possible by the minimal bead formation.

The invention claimed is:

1. A method for welding plastic pipes made of thermoplastic material by means of a butt-welding process, comprising the steps of:
   (a) providing a pair of opposed plastic pipes arranged in a coaxial position relative to one another and clamping the plastic pipes with clamping fixtures, each plastic pipe having an opposed end spaced from each other to define a space therebetween;
   (b) inserting trimming means in the space for trimming the opposed ends of the plastic pipes to a defined size and trimming the opposed ends of the plastic pipes to said defined size, the trimming comprising contacting trimmer stops of the trimming means with the clamping fixtures;
   (c) replacing the trimming means with a heating means for heating the opposed ends of the plastic pipes to produce a melting region on each pipe end, the heating means having stops;
   (d) determining an ambient temperature proximate the opposed ends of the pipes;
   (e) comparing the ambient temperature to a standard;
   (f) determining at least one of (1) an adjustment of a heating temperature of the heating means and (2) an adjustment of a heating duration as a result of the comparison of step (e);
   (g) adjusting at least one of (1) the temperature of the heating means and (2) the heating duration as a result of the determination in step (f);
   (h) contacting the opposed ends of the pipes with the heating means at the temperature and/or for the heating duration as adjusted in step (g) wherein the contacting the opposed ends comprises moving the clamping fixtures together and stopping movement of the clamping fixtures by contact with the stops of the heating means; and
   (i) pressing the pipe ends together to form a bead.

2. The method as claimed in claim 1, including joining the pipes together by displacement control.

3. The method as claimed in claim 1, including joining the pipes together by pressure control.

4. The method as claimed in claim 1, wherein the temperature of the heating means is adjusted.

5. The method as claimed in claim 1, wherein the heating duration is adjusted.

6. The method as claimed in claim 1, wherein both the temperature of the heating means and the heating duration are adjusted.

7. The method of claim 1 wherein:
a peak pressure during the contacting the opposed ends is higher than a peak pressure during the pressing.

8. The method of claim 1 wherein:
the pressing lacks a constant pressure phase.

9. The method of claim 1 wherein:
the contacting the opposed ends and the pressing each comprise an initial increase in pressure immediately followed by a progressive decrease in pressure.

10. The method of claim 1 wherein:
the contacting the opposed ends lacks a constant pressure equalization phase.

11. The method of claim 10 wherein:
the pressing lacks a constant pressure phase.

12. The method of claim 11 wherein:
a peak pressure during the contacting the opposed ends is higher than a peak pressure during the pressing.

13. The method of claim 12 wherein:
the contacting the opposed ends and the pressing each comprise an initial increase in pressure immediately followed by a progressive decrease in pressure.

14. A method for welding plastic pipes made of thermoplastic material by means of a butt-welding process, comprising the steps of:
   (a) providing a pair of opposed plastic pipes arranged in a coaxial position relative to one another and clamping the plastic pipes with clamping fixtures, each plastic pipe having an opposed end spaced from each other to define a space therebetween;
   (b) inserting trimming means in the space for trimming the opposed ends of the plastic pipes to a defined size and trimming the opposed ends of the plastic pipes to said defined size, the trimming comprising contacting trimmer stops of the trimming means with the clamping fixtures;
   (c) replacing the trimming means with a heating means for heating the opposed ends of the plastic pipes to produce a melting region on each pipe end;
   (d) determining an ambient temperature proximate the opposed ends of the pipes;
   (e) comparing the ambient temperature to a standard;
   (f) determining at least one of (1) an adjustment of a heating temperature of the heating means and (2) an adjustment of a heating duration as a result of the comparison of step (e);
   (g) adjusting at least one of (1) the temperature of the heating means and (2) the heating duration as a result of the determination in step (f);
   (h) contacting the opposed ends of the pipes with the heating means at the temperature and/or for the heating duration as adjusted in step (g); and
   (i) pressing the pipe ends together to form a bead, the pressing lacking a constant pressure phase so that there is no constant pressure phase from the time of contact of the pipe ends with the heating means until separation of the pipe ends from the heating means.

15. A method for welding plastic pipes made of thermoplastic material by means of a butt-welding process, comprising the steps of:

(a) providing a pair of opposed plastic pipes arranged in a coaxial position relative to one another and clamping the plastic pipes with clamping fixtures, each plastic pipe having an opposed end spaced from each other to define a space therebetween;
(b) inserting trimming means in the space for trimming the opposed ends of the plastic pipes to a defined size and trimming the opposed ends of the plastic pipes to said defined size, the trimming comprising contacting trimmer stops of the trimming means with the clamping fixtures;
(c) replacing the trimming means with a heating means for heating the opposed ends of the plastic pipes to produce a melting region on each pipe end;
(d) determining an ambient temperature proximate the opposed ends of the pipes;
(e) comparing the ambient temperature to a standard;
(f) determining at least one of (1) an adjustment of a heating temperature of the heating means and (2) an adjustment of a heating duration as a result of the comparison of step (e);
(g) adjusting at least one of (1) the temperature of the heating means and (2) the heating duration as a result of the determination in step (f);
(h) contacting the opposed ends of the pipes with the heating means at the temperature and/or for the heating duration as adjusted in step (g); and
(i) pressing the pipe ends together to form a bead, the contacting the opposed ends and the pressing each comprising an initial increase in pressure immediately followed by a progressive decrease in pressure.

* * * * *